(12) United States Patent
Strogov et al.

(10) Patent No.: US 11,550,913 B2
(45) Date of Patent: Jan. 10, 2023

(54) SYSTEM AND METHOD FOR PERFORMING AN ANTIVIRUS SCAN USING FILE LEVEL DEDUPLICATION

(71) Applicant: Acronis International GmbH, Schaffhausen (CH)

(72) Inventors: Vladimir Strogov, Moscow (RU); Serguei Beloussov, Costa del Sol (SG); Stanislav Protasov, Moscow (RU); Alexey Dod, Moscow (RU); Alexey Sergeev, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 148 days.

(21) Appl. No.: 16/806,285

(22) Filed: Mar. 2, 2020

(65) Prior Publication Data

US 2020/0285743 A1   Sep. 10, 2020

Related U.S. Application Data

(60) Provisional application No. 62/815,556, filed on Mar. 8, 2019.

(51) Int. Cl.
*G06F 21/56*    (2013.01)
*G06F 16/14*    (2019.01)
*G06F 16/174*   (2019.01)

(52) U.S. Cl.
CPC .......... *G06F 21/565* (2013.01); *G06F 16/152* (2019.01); *G06F 16/1748* (2019.01); *G06F 21/564* (2013.01); *G06F 21/568* (2013.01)

(58) Field of Classification Search
CPC .. G06F 21/565; G06F 16/152; G06F 16/1748; G06F 21/564; G06F 21/568; G06F 21/56; G06F 16/14; G06F 16/174
See application file for complete search history.

(56) References Cited

U.S. PATENT DOCUMENTS

| | | | |
|---|---|---|---|
| 9,323,758 B1 * | 4/2016 | Stacey | G06F 16/137 |
| 10,885,187 B1 * | 1/2021 | Djerbaka | G06F 16/183 |
| 2014/0258370 A1 * | 9/2014 | Bares | G06F 16/182 |
| | | | 709/203 |

* cited by examiner

*Primary Examiner* — Quazi Farooqui
(74) *Attorney, Agent, or Firm* — ArentFox Schiff LLP; Michael Fainberg

(57) ABSTRACT

Aspects of the disclosure describe methods and systems for performing an antivirus scan using file level deduplication. In an exemplary aspect, prior to performing an antivirus scan on files stored on at least two storage devices, a deduplication module calculates a respective hash for each respective file stored on the storage devices. The deduplication module identifies a first file stored the storage devices and determines whether at least one other copy of the first file exists on the storage devices. In response to determining that another copy exists, the deduplication module stores the first file in a shared database, replaces all copies of the first file on the storage devices with a link to the first file in the shared database, and performs the antivirus scan on (1) the first file in the shared database and (2) the files stored on the storage devices.

18 Claims, 8 Drawing Sheets

SYSTEM AND METHOD FOR PERFORMING AN ANTIVIRUS SCAN USING FILE LEVEL DEDUPLICATION

CROSS-REFERENCE TO RELATED APPLICATIONS

This application claims the benefit of U.S. Provisional Application No. 62/815,556, filed Mar. 8, 2019, which is herein incorporated by reference.

FIELD OF TECHNOLOGY

The present disclosure relates generally to the field of data storage, and more specifically, to systems and method for storing files and performing an antivirus scan using file level deduplication.

BACKGROUND

Inside large organizations, there may be hundreds of thousands of computing devices including employee workstations, servers, mobile devices, tablet computers and the like. To keep the organization secure from data theft or corruption, the data on these devices must be scanned continuously for viruses and/or other malicious software. The regular scanning of the data on all of these devices can take a considerable time, however, and may overwhelm individual devices, storage disks and the networks they are attached to. An additional problem exists in that there may be duplicates of files stored in several locations on several computing devices—this may further increase scanning times significantly and also wastes processing power that can be used for another purpose.

There is a need, then, for a solution reduces the amount of time required for scanning all data across the organization, taking into account duplicate content while simultaneously minimizing anti-virus scanning procedures in an effective manner.

SUMMARY

Aspects of the disclosure relate to the field of data security and storage. In particular, aspects of the disclosure describe methods and systems for performing an antivirus scan using file level deduplication.

In an exemplary aspect, prior to performing an antivirus scan on files stored on a first storage device and a second storage device, a deduplication module may calculate a respective hash for each respective file stored on the first storage device and the second storage device. In some aspects, the first storage device and the second storage device are comprised in one computing device (e.g., as different partitions of a hard drive in a computer). In some aspects, the first storage device is comprised in a first computing device (e.g., a smartphone) and the second storage device is comprised in a second computing device (e.g., a computer), wherein the first computing device and the second computing device are connected via a communication network (e.g., a local area network).

The deduplication module may identify a first file stored the first storage device. In some aspects, the first file may be stored in the second storage device. The deduplication module may determine whether at least one other copy of the first file exists on either the first storage device and the second storage device based on the calculated respective hashes. For example, a hash of the first file may match a hash of another file stored on one of or both the first storage device and the second storage device. Because the hashes match, the respective files are deemed as copies by the deduplication module.

In response to determining that at least one other copy of the first file exists on either the first storage device and the second storage device, the deduplication module may store the first file in a shared database. In some aspects, the shared database is also comprised in the same computing device as the first storage device and the second storage device. In some aspects, the shared database may be on a separate computing device (e.g., a server) that the first computing device and the second computing device can access via the communication network mentioned previously.

The deduplication module may replace all copies of the first file on the first storage device and the second storage device, each with a link to the first file in the shared database. The deduplication module may then perform the antivirus scan on (1) the first file in the shared database and (2) the files stored on the first storage device and the second storage device. Thus, rather than scanning multiple copies of the first file, the deduplication module only scans one version of the file.

In some aspects, the deduplication module may identify other files to deduplicate. For example, the deduplication module may identify a second file stored on the first storage device. In response to determining, based on the calculated hashes, that at least one other copy of the second file exists on either the first storage device and the second storage device, the deduplication module may also store the second file in the shared database (may be the same database of a different database as the one where the first file is stored). The deduplication module then replaces all copies of the second file on the first storage device and the second storage device each with a link to the second file in the shared database.

In some aspects, if multiple copies of the first file are stored in the same storage device, rather than creating links, the deduplication module may only keep one copy and remove all others. In other words, in response to determining that the at least one other copy of the first file is stored on the first storage device (also where the first file is stored), the deduplication module may delete the at least one other copy from the first storage device.

In some aspects, the deduplication module may create a record of the first file in the shared database, wherein the record comprises a hash of the first file. Subsequent to performing the antivirus scan, the deduplication module may mark in the record of the first file an indication that the first file has been scanned.

In some aspects, subsequent to the first file in the shared database being accessed via the link, the deduplication module may determine whether the hash of the first file has changed. In response to determining that the hash has changed, the deduplication module may rescan the first file.

In some aspects, in response to determining that at least one other copy of the first file does not exist on either the first storage device and the second storage device, the deduplication module may store a hash of the first file in the shared database along with a status of antivirus scan for the file.

In some aspects, the deduplication module may further detect an operation being performed on the first file that has been replaced with the link (e.g., a computing device may attempt to modify the first file). The deduplication module may then retrieve the first file using the link, perform the operation on the retrieved first file, and may replace the retrieved first file with the link. In some aspects, the deduplication module may create a new version of the first file in the shared database, and may replace the retrieved first file with a new link to the new version only at a storage device where the operation was performed.

It should be noted that the methods executed by the deduplication module described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for storage and antivirus scan using file level deduplication. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The deduplication of the files can significantly affect the process of regular antivirus scans, if there are two or more of the same files located on a single device or across a network of monitored devices. Each separate file may no longer need to be scanned individually, while still maintaining network security. Only a single copy of the file is kept and thus only this instance of the file is scanned, reducing CPU and memory usage in addition to physical resource usage. The file may be marked as "scanned" (AV flag), such that if the file has not changed, it is not scanned again. If the file must be rescanned (e.g., because the AV database was updated), only the single copy is scanned. Therefore, the deduplication process of the files becomes crucial to antivirus and malware scanning.

Figure 1:
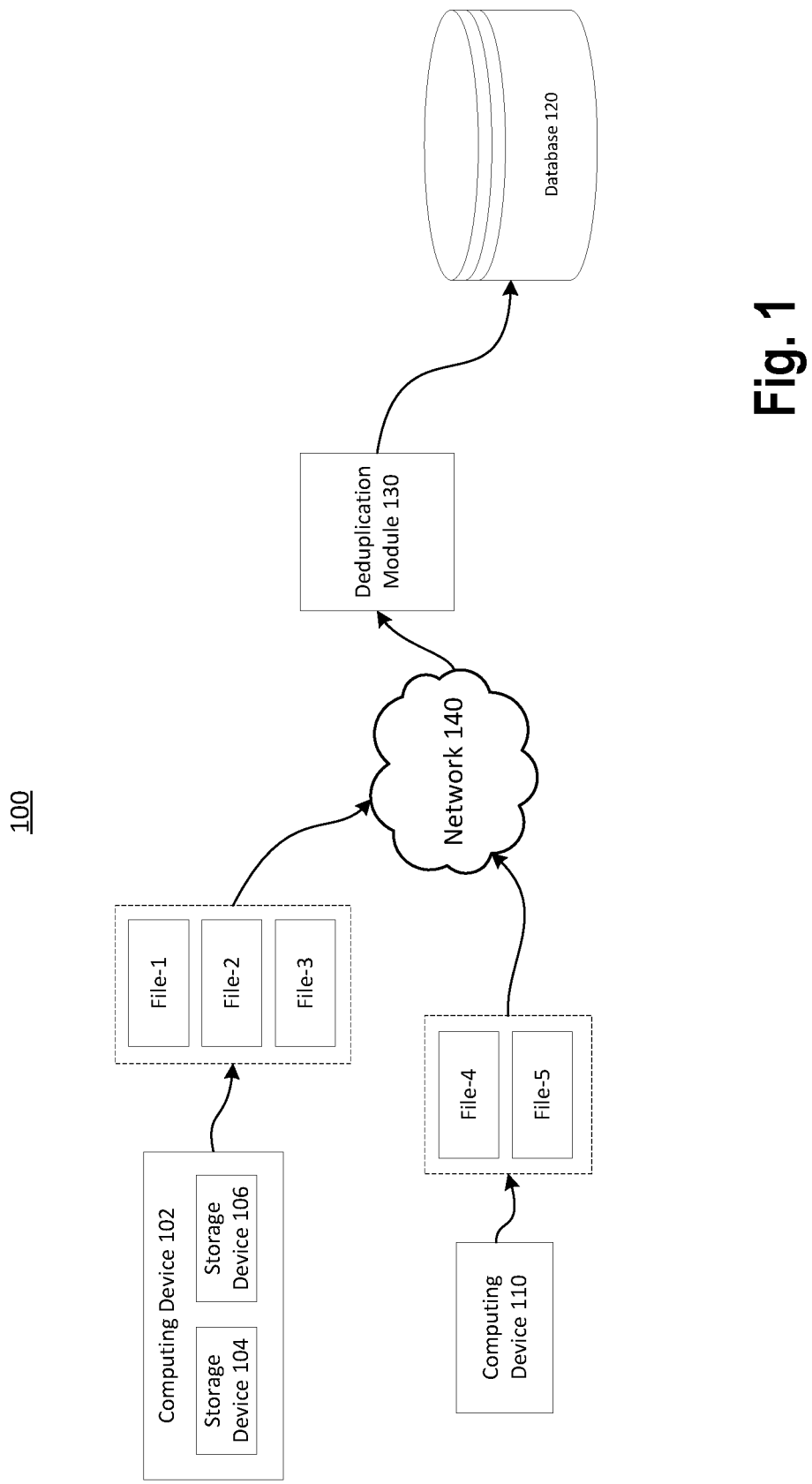
FIG. 1 is a block diagram illustrating a system for storage and antivirus scan using file-level deduplication, in accordance with exemplary aspects of the present disclosure.

FIG. 1 is a block diagram illustrating a system 100 for storage and antivirus scan using file level deduplication, in accordance with exemplary aspects of the present disclosure.

The system 100 comprises a plurality of computing devices, including, for example computing device 102 and computing device 110. The system 100 monitors all computing devices and files that are subject to antivirus and malicious software scans to determine if there are duplicates, and efficiently stores these files across the devices and network storage in order to avoid multiple scans of the same file.

For example, computing device 102 may have files 1, 2 and 3, while computing device 110 may have files 4 and 5 stored thereon, while part of larger network 140. For example, files 1, 2 and 3 may be stored on local storage devices of the computing device 102, while files 4 and 5 may be stored on network drives, or virtual storage of computing device 110. Each of these files must be scanned to determine whether they are or contain malicious software or virus components. In some aspects, one or more of the files 1-5 may be duplicates, or they may be individually distinct files. In some instances, file 4, for example, may be a modified version of file 2.

The system 100 further comprises a deduplication module 130 that avoids redundancy in scanning files by adding, removing and monitoring entries in database 120. The database 120 may contain contents of the files (e.g., files 1-5) across storage devices belonging to one or more organizations, and other metadata associated with those files such as identifying information, path information, status of the files or the like. In exemplary aspects, the database is coupled to network 140 via a high speed bus. In some aspects, the database is located in shared storage, accessible by computing devices 102 and 110 across network 140. In exemplary aspects of the present disclosure, the deduplication module 130 calculates hashes for the files 1-5. In some aspects, the hashes are calculated using commonly known hash calculation methods, e.g., checksums or the like.

Figure 2:
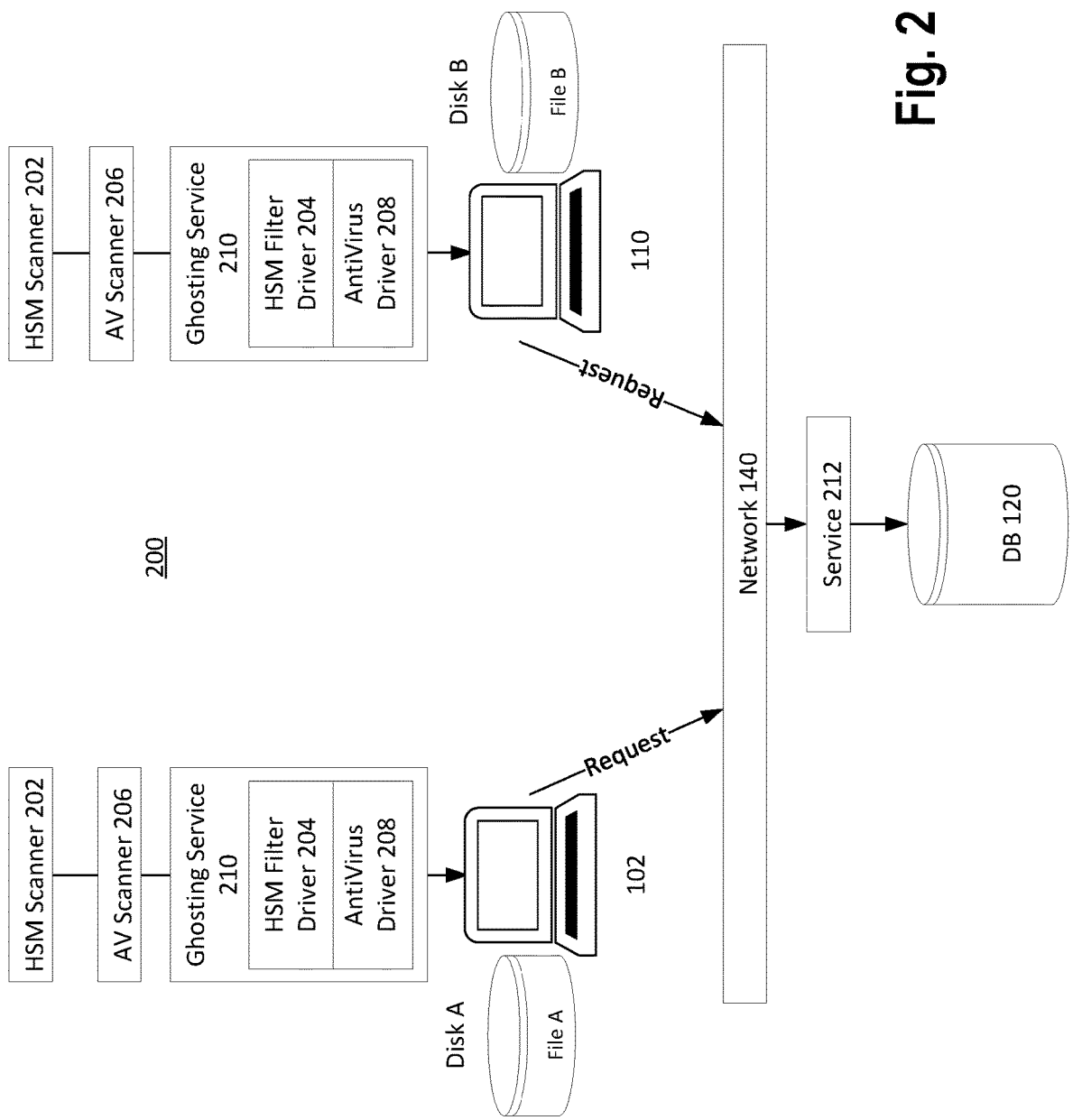
FIG. 2 illustrates an exemplary flow of the system, in accordance with exemplary aspects of the present disclosure.

The deduplication module 130 may then, after calculating the hash of a particular file, search the database 120 for the file. If a record with the same file identifier is found in the database, the deduplication module 130 knows that a hash for the file has already been calculated. If the file exists in more than two locations, the deduplication module 130 replaces all copies of the file on the storage devices (e.g., storage devices 104 and 106 of computing device 102) with links to a single copy of the file, e.g., on the shared database 120 or on some other shared storage device on the network 140. In some aspects, as shown in FIG. 2, the deduplication module 130 may communicate a command to an agent executing on each individual computing device (e.g., device 102 and 110) that executes the replacement. In other aspects, the deduplication module 130 can remotely replace the files with links.

Alternatively, if the deduplication module 130 determines that only a single copy of the file exists on the one or more storage devices, the deduplication module 130 stores the calculated hash of the file in the database 120 along with a status of the antivirus scan for the file. For example, the status of the antivirus scan indicates whether an antivirus scan has been performed on the file. In some aspects, if the field for status of the antivirus scan in a record for a file is empty, it is assumed that no antivirus scan has been performed for this file. If the field for status of the antivirus scan is flagged, indicating a scan has been previously performed, the deduplication module 130 then determines whether the currently calculated hash value of the file is different from the hash value stored in the record for the file in the database 120. When the two hash values do not differ, the file has not changed so the file is marked as scanned in the database 130 to avoid redundant antivirus scanning.

An exemplary flow 200 of the system 100 is illustrated in FIG. 2. In exemplary aspects, a scanner for hierarchical storage management (HSM) 202, an antivirus scanner 206, and a ghosting service 210 each have a component installed on the local computing device (e.g., computing device 102 and computing device 110). In some aspects, the HSM scanner 202 is implemented using an HSM filter driver 204 on each computing device. The HSM scanner 204 is configured to scan files, look for duplicate files, and assign markers to originals and links. The HSM filter driver 204 is configured to detect special markers on already scanned files (e.g., a reparse point in Windows NTFS or ReFS volumes) and control the access and I/O to these files (e.g., by providing data of the real file for the mentioned link files of duplicate files). Similarly, the antivirus scanner 206 may be implemented as an antivirus driver 208 installed on each computing device within a network or organization. Moreover, the ghosting service 210 may be implemented using ghosting drivers, and manages a redirection process where a user operates on links or references to a real file, stored on another storage device, or in a location different from the file reference location. Drivers 204, 208, and ghosting service 210 is further described in FIG. 4. In some aspects, both the HSM scanner 202 and the AV scanner 206 may be programs installed on individual computing devices, while in other aspects they may be processes that are executing on a computing device, but controlled by a remote centralized service. In FIG. 2, each computing device may submit a deduplication request via the network 140 to service 212. Computing device 102 has a storage disk A with file A stored thereon, while computing device 110 has a storage disk B with file B stored thereon.

The deduplication module 130 of FIG. 1 may be implemented as service 212 that can be accessed by each computing device via a service request, such as an HTTP request, SOAP request, JSON request or the like. Each client (computing device) contacts the service 212, for example according to a predetermined schedule (e.g., daily), to perform deduplication on files stored on their local (e.g., Disk A and B) or network storage disks. In an alternative aspect, each client sends a request for each file that the system 100 is tracking for deduplication, where parameters of the request indicate an operation (e.g., deduplicate, link, or remove) along with a hash value of the file, and any other metadata of the file including a file identifier, a path of the file on a disk, and the like, though other combinations of parameters are contemplated by the present disclosure.

The service 212 (e.g., a service component of the deduplication module 130), searches the database 120 to determine if more than one copy exists of a document identified by the file identifier specified in the parameters of the client request. As described above, if there are multiple copies of a single file in different locations already identified in the database, each of the files at those locations will be replaced with a link to the copy stored on the database 120. For example, service 212 may determine the hash of file A and the hash of file B. Service 212 may then determine whether the two hashes match. If the hashes of files A and B match, in one example, only a link to these files will remain on Disk A and Disk B, and the actual file will be stored on the database 120. AV scanner 206 and HSM scanner 202 may further scan the actual file and the status of the file record in database 120 will be marked as "already scanned." If only one record of the file exists across the network, the hash of the file is stored on the database as a record along with the file (deemed as the "master file"). Should a local copy be produced on either computing device 102 or 110, service 212 may determine the hash of the local copy and in response to detecting a hash match between the local copy and the master file on DB 120, replace the local copy with a link to the master file in DB 120.

Figure 3:
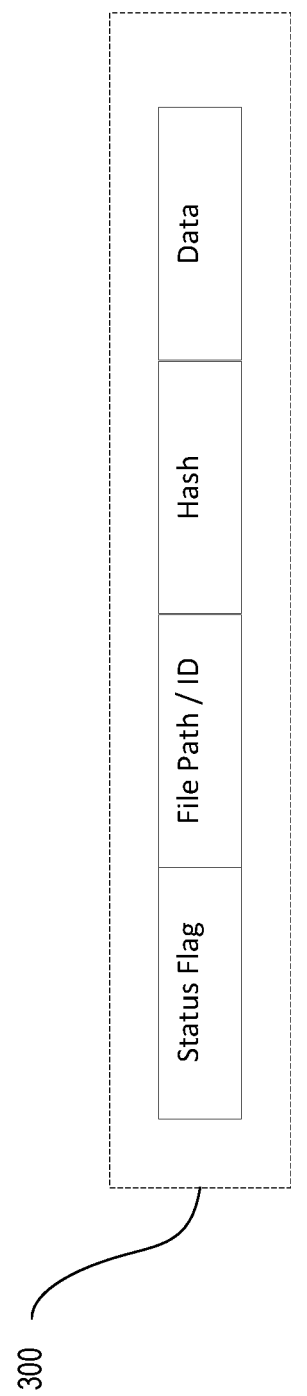
FIG. 3 illustrates an exemplary record created by the system in the database, in accordance with exemplary aspects of the present disclosure.

FIG. 3 illustrates an exemplary record created by the system 100 in database 120, in accordance with exemplary aspects of the present disclosure.

In the illustrated aspect, each record 300 in the database corresponds to a file that has been recorded or scanned by the deduplication module 130. There may be multiple records corresponding to one file. Each record 300 may comprises a status flag, a file path and/or a file identifier, a calculated hash of the file, and file data. The present disclosure also contemplates the need to store other related data about the file within the record, and does not limit the fields to those illustrated or described herein.

The status flag is a binary flag indicating whether a scan has been performed on this file or not, and may be a Y (yes) or N (no), or alternatively a 1 (yes) or 0 (no), though other values may also be used. This flag is updated after an AV scanner 206 as illustrated in FIG. 2 performs a scan on a file, and the client submits a request across network 140 to the service component of the deduplication module 130. Furthermore, the status flag is read prior to performing antivirus scans by the scanner AV, to determine whether an antivirus scan is necessary at all, thus reducing resource intensive antiviral scans.

The file path is a string that contains the path of the actual file across the network 140. In some aspects, the file path identifies a storage device where the file is stored, and the computing device associated with the storage device. An additional file identifier may be stored as a distinct key to distinguish the file from other files with similar names or similar paths. As discussed above, the hash of the file is calculated and sent to a service component of the deduplication module 130. In some aspects the hash is used to identify and remove files or update locations of the file with links to the data of the file when hashes match.

Finally, the data field is the electronic contents of each monitored file and computing devices may link to this data instead of storing the file locally. In some aspects, the data is stored as a binary blob in the database. In other aspects, the database record 300 only stores a link to the location of the copy of the file stored in network shared storage.

Figure 4:
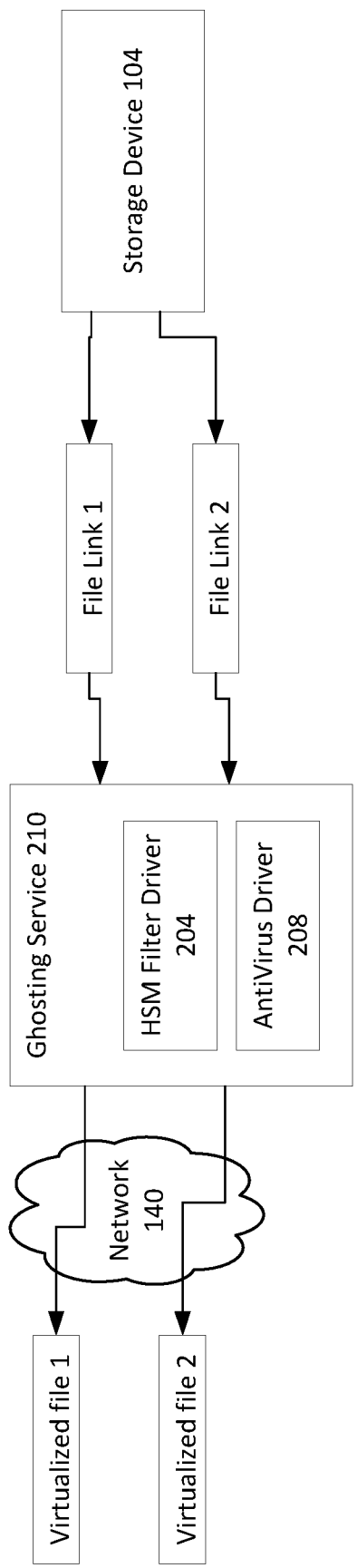
FIG. 4 is a block diagram of a component of the ghosting service shown in FIG. 2, according to exemplary aspects of the present disclosure.

FIG. 4 is a block diagram of a component of the ghosting service 210 shown in FIG. 2, according to exemplary aspects of the present disclosure.

The ghosting service 210 comprises a hierarchical storage manager (HSM) filter driver 204 and an antivirus driver 208. In exemplary aspects, the ghosting service 210 provides storage and deduplication services for virtualized files such as virtualized files 1 and 2 (e.g., those files that are not stored on the local machine, but on the network storage in the database 120, accessible via network 140). In this case, on the local computing device (e.g., computing device 102 and 110) there are links to the files (e.g., file link 1 and file link 2) in the central database 120. If the contents are needed, the contents of the file are retrieved from the database 120. In some aspects, after the needed operation is performed on the file, the file may again be replaced with a link and the file in the database may be updated. Alternatively, a new version of the file is created in the database 120, and only at the computing device where an operation is performed on the file, the file is replaced with a link to the new file version.

The ghosting service 210 operates with the "virtual" objects (i.e., those objects that have been deduplicated). When the deduplication module 130 replaces a file with the link to the file in the database 120, drivers must monitor the connection to the "master file" on the database 120. The HSM filter driver 204 may retrieve the copy of this file for a certain computing device, for example, if a user needs to edit the file A on computing device 102 shown in FIG. 2. The HSM filter driver 204 may notify the database 120 via the service component 212 of deduplication module 130 (or notify the deduplication module 130 directly) when a file has been changed. In this case, the "master file" is updated to the latest version. In another aspect if different users need different versions of the file, another version of the file can be created on the database 120 on the shared storage where the database 120 keeps file contents (e.g., master files).

Figure 5:
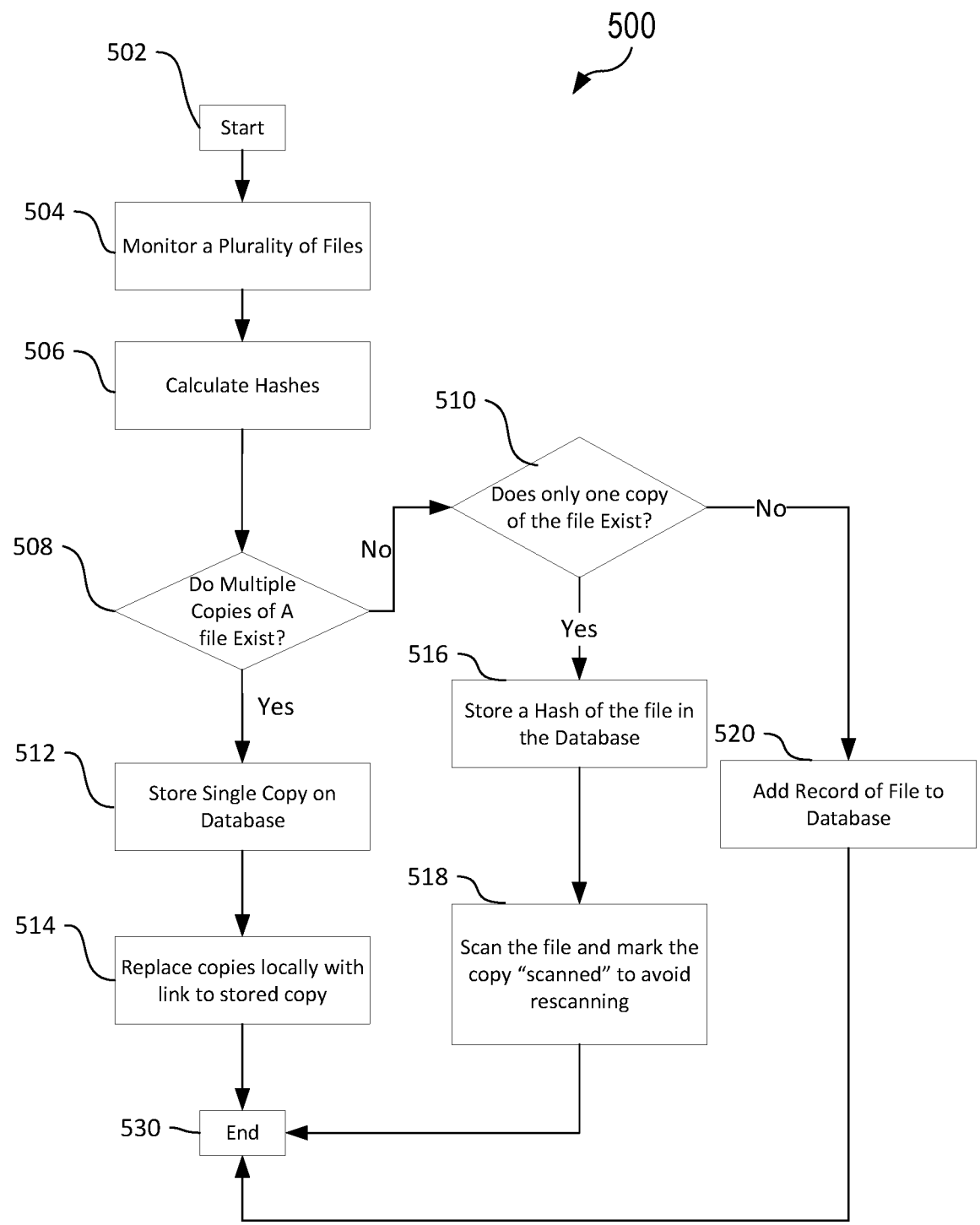
FIG. 5 is a flowchart illustrating a method for storage and antivirus scan using file level deduplication, in accordance with exemplary aspects of the present disclosure.

FIG. 5 is a flowchart illustrating a method 500 for storage and antivirus scan using file level deduplication, in accordance with exemplary aspects of the present disclosure.

The method begins at 502 and proceeds to 504.

At 504, the deduplication module 130 monitors a plurality of files (e.g., the files stored on storage devices of computers across one or more organizations or networks). The deduplication module 130 may, for example, request a plurality of file identifiers and metadata from each of computing devices 102 and 110 via network 140. Referring to FIG. 1, computing device 102 may provide a list comprising identifiers and metadata of files 1, 2, and 3. Computing device 110 may provide a list comprising identifiers and metadata of files 4 and 5.

The method 500 then proceeds to 506, where the deduplication module 130 calculates hashes for the plurality of files that have been monitored. Referring to FIG. 1, the deduplication module 130 may determine respective hashes for each of files 1-5 based on the identifier and metadata information of each respective file.

The deduplication module 130 then determines whether multiple copies of the file exist across a plurality of computing devices in step 508. For example, the deduplication module may compare each determined hash with one another (e.g., the hash of file 1 with the hashes of files 2-5). In response to determining that two hashes match, the deduplication file determines that two copies exist of the file. There are several scenarios where at least two copies can be detected. For example, file 1 from computing device 102 may be a copy of any combination of files 4 and 5 from computing device 110. In another example, file 1 from storage file 104 may be a copy of file 2 from storage device 106 (on the same device). In yet another example, file 1 from storage file 104 may be a copy of file 3 from storage device 106 (on the same device and same storage). If at least two copies of a file exist, the method proceeds to 512, the deduplication module 130 stores a single copy of the file (deemed the "master" file) in the database 120. In some aspects, the deduplication module 120 stores the master file in a shared network resource between the computing devices and database 120 and stores a link pointing to the location of the master file in the database 120.

As the method proceeds to 514, the deduplication module 130 replaces all local copies on the plurality of computing devices with links to the database "master file." Suppose that file 1 and file 5 share the same hash (i.e., are copies). The deduplication module 130 may generate a copy of file 1 and store it in database 120. The deduplication module 130 may further delete files 1 and 5 from computing devices 102 and 110, respectively, and store in their place links to the master file.

However, if at step 508, multiple copies are not determined to exist in the plurality of computing devices, the method proceeds to 510, where the deduplication module 130 determines whether only one copy of the file exists across the plurality of computing devices.

If one copy exists, the method 500 then proceeds to 516 where the deduplication module 130 stores the calculated hash of the file in the database as a record. The method 500 proceeds to 518 where AV scanner 206 scans the file and the deduplication module 130 marks the files as "scanned" to avoid rescanning.

If even one copy does not exist (i.e., there is no record in the database), the method 500 then proceeds to 520 where a record is added to the database.

The method terminates at 530.

Figure 6:
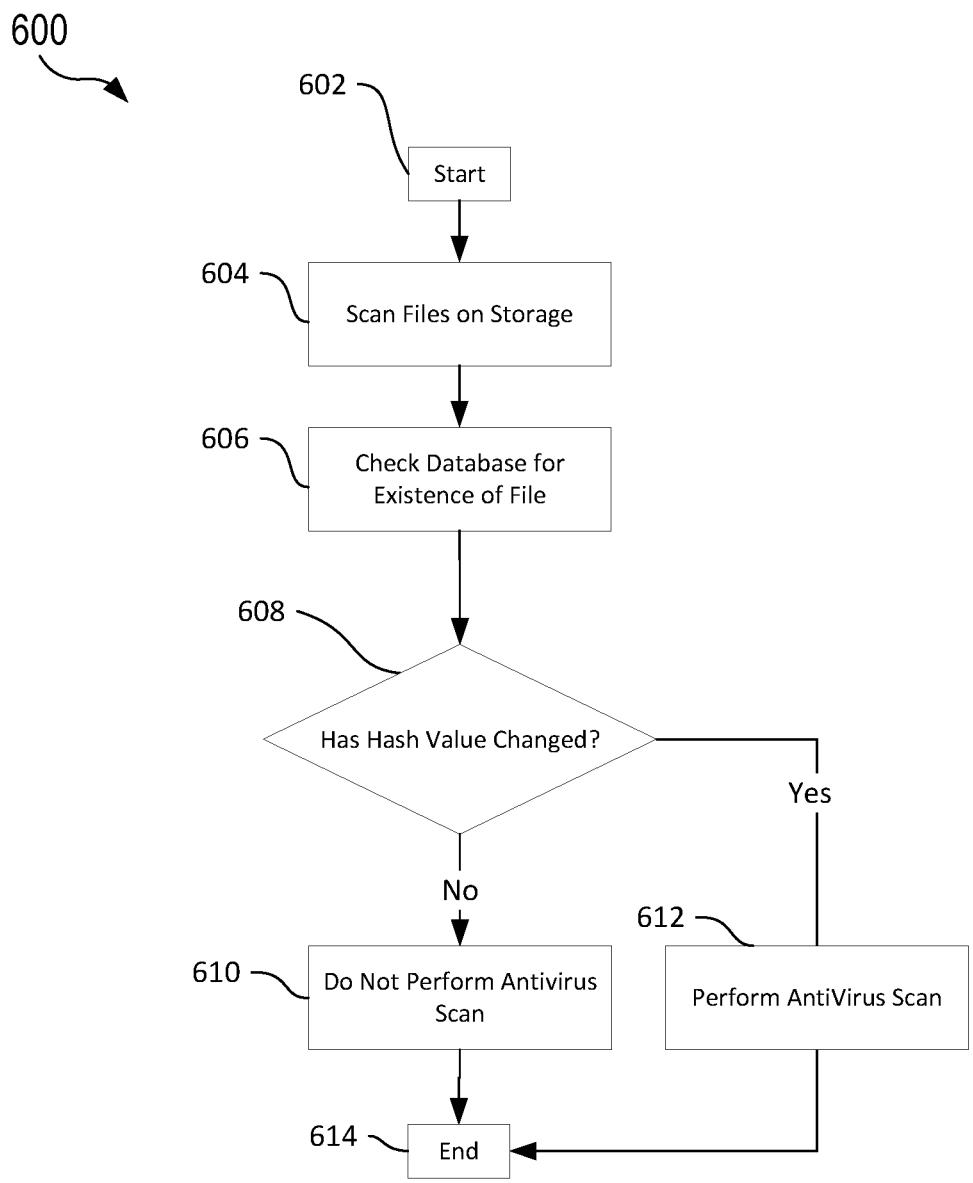
FIG. 6 is a flowchart illustrating a method for antivirus scanning, in accordance with exemplary aspects of the present disclosure.

FIG. 6 is a flowchart illustrating a method for antivirus scanning, in accordance with exemplary aspects of the present disclosure.

The method begins at 602 and proceeds to 604.

At 604, an agent associated with each of the plurality of computing devices begins antivirus scanning on the computing device. In some aspects, the agent may be a process controlled by a central antivirus scanning service. In other aspects, the agent may be an antivirus software component (e.g., AV scanner 206), run on demand or according to a predetermined schedule.

At 606, the agent searches database 120 containing a plurality of records of files stored across a plurality of computing devices.

At 608, the agent determines whether a calculated value of a file on the computing device is equal to the hash value of the same file in the database 120. If the hash values match, the method proceeds to 610, where an antivirus scan is not performed. In some aspects, at 608, the agent further proceeds to check the field for whether an antivirus scan has been performed for this file, and if a scan has been performed, the agent skips over this file and does not perform a virus scan at 610.

However, if at 608 if the hash value has changed, the method proceeds to 612. At 612, the agent performs an antivirus scans on the file.

The method terminates at 614.

Figure 7:
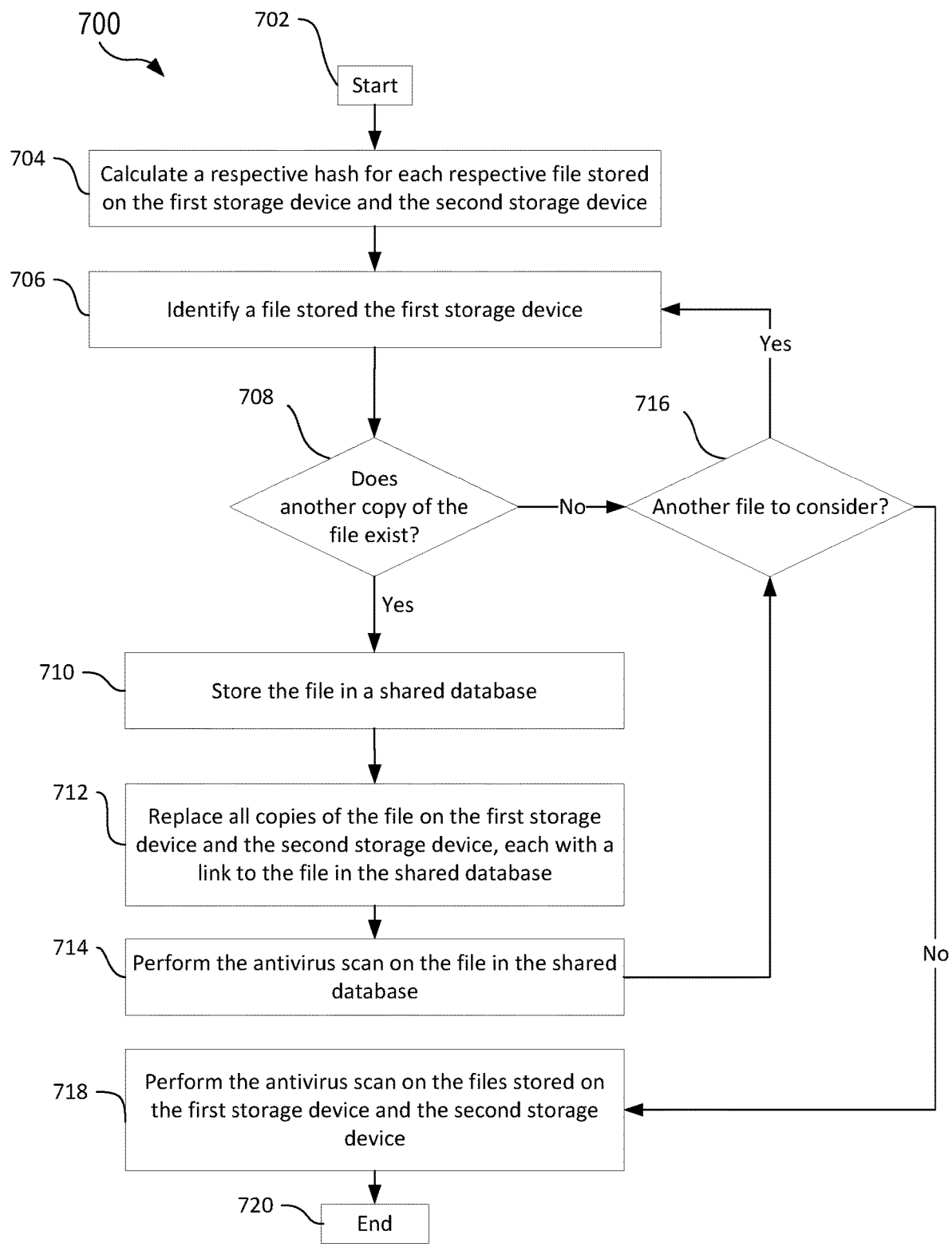
FIG. 7 is a flowchart illustrating a method for antivirus scanning using file level deduplication, in accordance with exemplary aspects of the present disclosure.

FIG. 7 is a flowchart illustrating a method 700 for antivirus scanning using file level deduplication, in accordance with exemplary aspects of the present disclosure.

The method begins at 702, prior to a AV scanner 206 performing an antivirus scan on files stored on a first storage device (e.g., storage device 104) and a second storage device (e.g., storage device 106 or storage on computing device 110).

At 704, deduplication module 130 calculates a respective hash for each respective file stored on the first storage device and the second storage device.

At 706, deduplication module 130 identifies a file (e.g., a first file) stored on the either the first storage device or the second storage device.

At 708, deduplication module 130 determines whether at least one other copy of the file exists on either the first storage device and the second storage device based on the calculated respective hashes.

In response to determining that at least one other copy of the first file exists on either the first storage device and the second storage device, method 700 advances to 710, where deduplication module 130 stores the file in a shared database.

At 712, deduplication module 130 replaces all copies of the file on the first storage device and the second storage device each with a link to the file in the shared database.

At 714, AV scanner 206, under instruction of deduplication module 130, performs the antivirus scan on the file in the shared database. From 714, method 700 advances to 716, where deduplication module 130 determines whether there are other files in the first storage device and the second storage device that need to be considered for deduplication. In some aspects, deduplication module 130 generates a list of the plurality of files on both storage devices and considers each file in the list. For example, deduplication module 130 may identify a second file on the list and repeat the steps 706 to 714. Once all files have been considered for deduplication, deduplication module 130 determines that there are no other files to consider and at 718, AV scanner 206 performs an antivirus scan of the files stored on the first storage device and the second storage device.

The method 700 terminates at 720.

Figure 8:
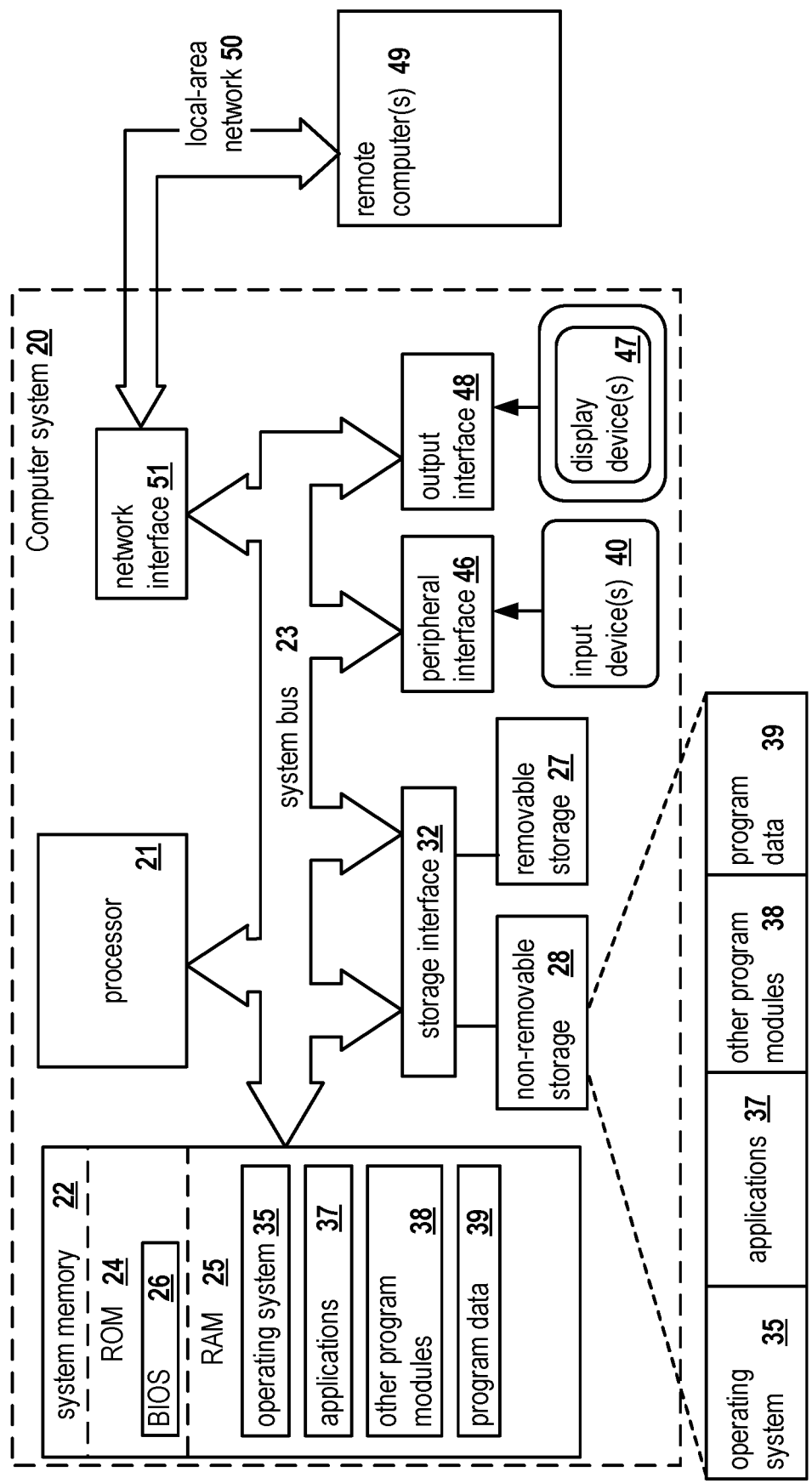
FIG. 8 is a block diagram of a computer system on which the disclosed system and method can be implemented according to an exemplary aspect.

FIG. 8 is a block diagram illustrating a computer system 20 on which aspects of systems and methods for storage and antivirus scan using file level deduplication may be implemented in accordance with an exemplary aspect. It should be noted that the computer system 20 can correspond to the any components of the system 100 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for performing an antivirus scan using file level deduplication, the method comprising:
   prior to performing an antivirus scan on files stored on a first storage device and a second storage device:
      calculating a respective hash for each respective file stored on the first storage device and the second storage device;
      identifying a first file stored on the first storage device;
      determining whether at least one other copy of the first file exists on either the first storage device or the second storage device based on the calculated respective hashes;
      in response to determining that at least one other copy of the first file exists on either the first storage device or the second storage device:
         storing the first file in a shared database; and
         replacing all copies of the first file on the first storage device and the second storage device each with a link to the first file in the shared database;
      detecting an operation being performed on the first file that has been replaced with the link;
      retrieving the first file using the link;

performing the operation on the retrieved first file;
replacing the retrieved first file with the link; and
performing the antivirus scan on (1) the first file in the shared database and (2) the files stored on the first storage device and the second storage device.

2. The method of claim 1, further comprising:
identifying a second file stored on the first storage device;
in response to determining, based on the calculated hashes, that at least one other copy of the second file exists on either the first storage device or the second storage device:
storing the second file in the shared database; and
replacing all copies of the second file on the first storage device and the second storage device each with a link to the second file in the shared database.

3. The method of claim 1, wherein the first storage device and the second storage device are comprised in one computing device.

4. The method of claim 1, wherein the first storage device is comprised in a first computing device and the second storage device is comprised in a second computing device, wherein the first computing device, the second computing device, and the shared database are all connected via a communication network.

5. The method of claim 1, further comprising:
in response to determining that the at least one other copy of the first file is stored on the first storage device, deleting the at least one other copy from the first storage device.

6. The method of claim 1, further comprising:
creating a record of the first file in the shared database, wherein the record comprises a hash of the first file;
subsequent to performing the antivirus scan, marking in the record of the first file an indication that the first file has been scanned.

7. The method of claim 6, further comprising:
subsequent to the first file in the shared database being accessed via the link, determining whether the hash of the first file has changed; and
in response to determining that the hash has changed, rescanning the first file.

8. The method of claim 1, further comprising:
in response to determining that at least one other copy of the first file does not exist on either the first storage device or the second storage device, storing a hash of the first file in the shared database along with a status of antivirus scan for the file.

9. The method of claim 1, further comprising:
creating a new version of the first file in the shared database; and
replacing the retrieved first file with a new link to the new version only at a storage device where the operation was performed.

10. A system for performing an antivirus scan using file level deduplication, the system comprising:
a hardware processor configured to:
prior to performing an antivirus scan on files stored on a first storage device and a second storage device:
calculate a respective hash for each respective file stored on the first storage device and the second storage device;
identify a first file stored on the first storage device;
determine whether at least one other copy of the first file exists on either the first storage device or the second storage device based on the calculated respective hashes;
in response to determining that at least one other copy of the first file exists on either the first storage device or the second storage device:
store the first file in a shared database; and
replace all copies of the first file on the first storage device and the second storage device each with a link to the first file in the shared database;
detect an operation being performed on the first file that has been replaced with the link;
retrieve the first file using the link;
perform the operation on the retrieved first file;
replace the retrieved first file with the link; and
perform the antivirus scan on (1) the first file in the shared database and (2) the files stored on the first storage device and the second storage device.

11. The system of claim 10, wherein the hardware processor is further configured to:
identify a second file stored on the first storage device;
in response to determining, based on the calculated hashes, that at least one other copy of the second file exists on either the first storage device or the second storage device:
store the second file in the shared database; and
replace all copies of the second file on the first storage device and the second storage device each with a link to the second file in the shared database.

12. The system of claim 10, wherein the first storage device and the second storage device are comprised in one computing device.

13. The system of claim 10, wherein the first storage device is comprised in a first computing device and the second storage device is comprised in a second computing device, wherein the first computing device, the second computing device, and the shared database are all connected via a communication network.

14. The system of claim 10, wherein the hardware processor is further configured to:
in response to determining that the at least one other copy of the first file is stored on the first storage device, delete the at least one other copy from the first storage device.

15. The system of claim 10, wherein the hardware processor is further configured to:
create a record of the first file in the shared database, wherein the record comprises a hash of the first file;
subsequent to performing the antivirus scan, mark in the record of the first file an indication that the first file has been scanned.

16. The system of claim 15, wherein the hardware processor is further configured to:
subsequent to the first file in the shared database being accessed via the link, determine whether the hash of the first file has changed; and
in response to determining that the hash has changed, rescan the first file.

17. The system of claim 10, wherein the hardware processor is further configured to:
create a new version of the first file in the shared database; and
replace the retrieved first file with a new link to the new version only at a storage device where the operation was performed.

18. A non-transitory computer readable medium storing thereon computer executable instructions for performing an antivirus scan using file level deduplication, including instructions for:

prior to performing an antivirus scan on files stored on a first storage device and a second storage device:
  calculating a respective hash for each respective file stored on the first storage device and the second storage device;
  identifying a first file stored on the first storage device;
  determining whether at least one other copy of the first file exists on either the first storage device or the second storage device based on the calculated respective hashes;
  in response to determining that at least one other copy of the first file exists on either the first storage device or the second storage device:
    storing the first file in a shared database; and
    replacing all copies of the first file on the first storage device and the second storage device each with a link to the first file in the shared database;
  detecting an operation being performed on the first file that has been replaced with the link;
  retrieving the first file using the link;
  performing the operation on the retrieved first file;
  replacing the retrieved first file with the link; and
performing the antivirus scan on (1) the first file in the shared database and (2) the files stored on the first storage device and the second storage device.

* * * * *